United States Patent [19]
Tanaka et al.

[11] Patent Number: 6,156,095
[45] Date of Patent: Dec. 5, 2000

[54] METHOD FOR PRODUCING HIGH PURITY ALUMINUM

[75] Inventors: Ichiro Tanaka, Niihama; Hiroshi Tabuchi, Tsukuba; Akihiko Takahashi, Ryugasaki, all of Japan

[73] Assignee: Sumitomo Chemical Company, Limited, Osaka, Japan

[21] Appl. No.: 09/129,678

[22] Filed: Aug. 6, 1998

[30] Foreign Application Priority Data

Aug. 8, 1997 [JP] Japan .................................. 9-214667

[51] Int. Cl.$^7$ .......................... C22B 21/06; B22D 21/04; B22D 27/08; B22D 27/13
[52] U.S. Cl. .................................................. 75/679
[58] Field of Search .................... 148/549, 551; 164/47; 75/679

[56] References Cited

U.S. PATENT DOCUMENTS 5,110,352  5/1992  Toyoda et al. ............................. 75/679

FOREIGN PATENT DOCUMENTS

| 99948 | 2/1984 | European Pat. Off. ................. 75/679 |
| 61-003385 | 1/1986 | Japan . |
| 63-64504 | 12/1988 | Japan . |
| 5-85258 | 12/1993 | Japan . |
| 406002054 | 1/1994 | Japan ...................................... 75/679 |

*Primary Examiner*—Sikyin Ip
*Attorney, Agent, or Firm*—Birch, Stewart, Kolasch & Birch LLP

[57] ABSTRACT

The present invention provides a method for producing high purity aluminum by immersing a cooling body in molten aluminum, and forming and growing crystals of the high purity aluminum on the cooling body by rotating the cooling body and introducing bubbles of a gas into the rotating molten aluminum by the rotation of the cooling body.

5 Claims, No Drawings

METHOD FOR PRODUCING HIGH PURITY ALUMINUM

FIELD OF THE INVENTION

The present invention relates to a method for producing high purity aluminum. More particularly, the present invention relates to a method for producing high purity aluminum by crystallizing the same from molten aluminum containing eutectic crystal impurities such as Si and Fe, by the use of the segregation principle.

BACKGROUND OF THE INVENTION

Conventionally, as to methods for producing high purity aluminum according to the segregation principle, there has been known: a method in which the molten aluminum in the vicinity of a solidification interface is stirred such that when molten aluminum is cooled, it is solidified from a downward or circumferential direction; a method in which a cooling body is immersed in the molten aluminum, and the cooling body is rotated while supplying a cooling medium into the cooling body, thereby crystallizing purified aluminum with high purity on the circumferential surface; and the like.

In the purification method according to the segregation principle, the concentrated layer of impurities discharged into the molten aluminum in the vicinity of the solidification interface is reduced in thickness as much as possible to disperse the impurities throughout the molten aluminum. This results in an improvement of purification efficiency. In order to improve purification efficiency as described above at a relatively fast production velocity, there has been proposed a technique whereby the relative velocity between crystallized aluminum and molten aluminum is increased to enhance the efficiency of discharging concentrated impurities into the molten aluminum having less impurities. For example, there has been disclosed a method in Japanese Patent Publication No. 61-3385, wherein a cooling body is rotated so that the relative velocity between the outer regions of the cooling body and the molten aluminum falls in the range of 1600 mm/s to 8000 mm/s, whereby the concentrated layer of impurities in the vicinity of solidification interface is reduced in thickness to enhance the purity of the obtained aluminum. Also, in Japanese Patent Publication No. 63-64504, there has been proposed the following method: in solidifying molten aluminum from a downward direction, bubbles are released from the center of the lower part of a rotating body into the molten aluminum in the vicinity of the solidification interface to induce a concentrated layer of impurities to disperse. This causes the impurities to disperse throughout the molten aluminum, thereby enhancing the purity of the purified aluminum.

Further, as a method for removing hydrogen from molten aluminum with efficiency, there has been proposed a method in Japanese Patent Publication No. 5-852558, in which molten aluminum is stirred, and a gas which can remove hydrogen is blown into the molten aluminum to solidify the molten aluminum in one direction.

However, with these conventional methods, impurities in the obtained aluminum cannot be removed to a sufficient degree. For example, in the method of using a rotated cooling body, it is desirable to make the relative velocity between the outer regions of the cooling body and the molten aluminum as high as possible in order to enhance the purity of the obtained aluminum. However, since the molten aluminum also flows in the same direction in accordance with the rotation of the cooling body, there is a limit on the effect of reducing the concentrated layer of impurities in thickness. Also, even if bubbles are discharged from the center of the lower part of the rotating body into the liquid phase in the vicinity of the solidification interface when the molten aluminum is solidified from a downward direction, the bubbles are lighter in weight than the molten aluminum, and hence move upwards. This limits the arrival at the concentrated layer of impurities in the vicinity of the solidification interface, and the stirring function thereof. Further, even if the molten aluminum is stirred and a gas which can remove hydrogen is blown into the molten aluminum, during which the unidirectional solidification of the molten aluminum is effected, and the hydrogen is removed from the molten aluminum with high efficiency, the removal efficiency of the eutectic crystal impurities such as Si and Fe is not necessarily sufficient.

SUMMARY OF THE INVENTION

It is an object of the present invention to provide a method for producing high purity aluminum, which has overcome the forgoing problems.

The present inventors have intensively studied on the purification of aluminum according to the segregation principle, and have discovered a highly advantageous method for producing high purity aluminum with extremely high purification efficiency by using a cooling body, and have thus completed the present invention.

That is, the present invention provides a method for producing a high purity aluminum, said method comprising the steps of:

immersing a cooling body in a molten aluminum, wherein the molten aluminum is at a temperature that is within a liquid phase temperature range thereof, and wherein the surface temperature of an exterior surface of the cooling body is less than said liquid phase temperature range of the molten aluminum; and forming and growing crystals of the high purity aluminum on the exterior surface of the cooling body by (i) rotating the cooling body to cause the molten aluminum to rotate, such that the centrifugal acceleration exerted on the molten aluminum by said rotation falls within the range of 0.01 m/s$^2$ to 1500 m/s$^2$, and (ii)introducing bubbles of a gas into the rotating molten aluminum such that the amount of gas bubbles introduced into the molten aluminum falls within the range of from 0.01 to 150 liters, when measured at 25° C., 1 atmosphere of pressure(760 mm Hg), for each kilogram of the high purity aluminum that is forming and growing as crystals on the surface of the cooling body.

DETAILED DESCRIPTION OF THE INVENTION

With the method of the present invention, a cooling body is rotated, which cause molten aluminum to rotate around the cooling body, and the reaction force to the centrifugal force exerted on the molten aluminum makes bubbles of an introduced gas move toward a solidification interface between purified aluminum that is crystallized on the surface of the cooling body and the molten aluminum. Then, the bubbles chafe against the solidification interface and in the vicinity thereof with surfacing. Consequently, a concentrated layer of impurities is removed with high efficiency by the bubbles of the introduced gas at the solidification interface, thereby extremely enhancing the purification efficiency of the inventive method, whereby purified aluminum is obtained. That is, in accordance with the method of the present invention, the reaction force to the centrifugal force exerted on the molten aluminum can be used to cause the bubbles of the introduced gas in the molten aluminum to migrate to the solidification interface with efficiency, and makes the gas bubbles rise with chafing against the solidification interface. This enables the removal of the concentrated layer of the impurities arising on the solidification interface with high efficiency.

In the present invention, in order to rotate molten aluminum around the cooling body, it is possible to utilize a viscous flow effect resulting from the rotation of a vessel holding the molten aluminum, an impeller stirrer that is independent of the cooling body, a rotating magnetic field, and the like, or a combination thereof. In addition, one may rotate the cooling body either alone or in combination with other methods of rotating the molten aluminum in order to cause said rotation of the molten aluminum.

In the method of the present invention, the molten aluminum is rotated around the cooling body so that the centrifugal acceleration exerted on the molten aluminum falls in the range of 0.01 m/s² to 1500 m/s², preferably in the range of 0.1 m/s² to 800 m/s², more preferably in the range of 1 m/s² to 500 m/s². When the centrifugal acceleration exerted on the molten aluminum is less than 0.01 m/s² the bubbles of the introduced gas insufficiently reach the solidification interface between the purified aluminum crystallized on the surface of the cooling body and the molten aluminum, and the vicinity thereof. When it exceeds 1500 m/s², it is difficult for the gas bubbles to come up to the surface and leave, due to the large centrifugal force. This results in the formation of a cavity on the surface of the cooling body, which makes it difficult for aluminum to crystallize and grow.

In the method of the present invention, the gas bubbles can be introduced into the molten aluminum with through various methods including: a method of using a separate gas bubble introduction tube from the cooling body; a method in which the bottom of the holding vessel is provided with a minute gas bubble introduction port; a method in which introduction is conducted through an opening at the bottom of the cooling body; and the like. It is preferable that the gas bubble introduction port is established so as to introduce gas bubbles into the molten aluminum rotating around the cooling body so that the centrifugal acceleration exerted on the molten aluminum falls in the range of 0.01 m/s² to 1500 m/s².

In the present invention, the preferable distance range in which the molten aluminum is rotated around the cooling body differs depending upon the method for rotating the molten aluminum. However, it is enough if the gas bubbles can be introduced so that the gas bubbles introduced into the molten aluminum can reach the solidification interface efficiently and move upwards with chafing against the solidification interface by using the reaction force to the centrifugal force exerted on the molten aluminum, efficiently remove the concentrated layer of impurities arising on the solidification interface. It is preferable that the gas bubbles occupy a distance between the solidification interface (aluminum crystallized on the surface of the cooling body) and the molten aluminum which falls in the range of 1 mm to 10 mm, in the vicinity of the cooling body.

In order to further improve the purification efficiency, it is more preferable that the mass of molten aluminum being rotated cover as wide range as possible. That is, it is preferable that the molten aluminum, from the solidification interface to the internal wall of holding vessel of the molten aluminum, rotates at the rotating velocity of the present invention.

In the present invention, as the kind of gas for forming the gas bubbles to be introduced into the molten aluminum, any gas or gases may be employed, so long as the gas (or gases) is in the gas state at the temperature of the molten aluminum. However, gases which will not dissolve in a large amount in the molten aluminum are preferable. Thus, inactive gas to the molten aluminum (such as helium gas and argon gas), substantially inactive gas to the molten aluminum (such as nitrogen gas), air, chlorine gas, chloride gas, and mixed gas thereof are available.

As chloride gas, a volatile flux such as zinc chloride, aluminum chloride, titanium (IV) chloride, hexachloroethane, carbon tetrachloride, and hexachlorobenzene, that are in the gas state in the molten aluminum are also available.

Especially, air forms a tough film of oxide on the surface of the bubble, and hence it has a high effect of chafing the solidification interface and the vicinity thereof, thereby removing the concentrated layer of the impurities at the solidification interface with higher efficiency. Consequently, the purification efficiency of aluminum can be further improved. Moreover, air is available at lower cost than in the case of other gases, and hence it is preferable.

Also, the dew point of each gas described above is not specifically limited. However, in the cases of the inactive gas and substantially inactive gas, it is preferable that steam is contained therein, and the dew point is preferably in the range of −8° C. to 30° C. When the dew point is −8° C. or more, the purification efficiency may become extremely high, thus being preferable. When the dew point exceeds 30° C., dew condensation may tend to occur in the piping and on the periphery of the apparatus. Accordingly, if moisture attached due to dew condensation drops in the molten aluminum, phreatic explosion may become likely to occur.

It is preferable that not too much moisture be contained in each of the gases described above, so as to help avoid the possibility of an explosion that might otherwise occur as said moisture rapidly changes to steam in the rotating molten aluminum.

In the present invention, the amount of gas for forming the gas bubbles to be introduced into the molten aluminum may differ depending upon the kind of gas utilized. However, generally, the amount of gas added is in the range of 0.01 to 150 liters, preferably 0.1 to 100 liters (25° C., 1 atm pressure(760 mm Hg)) per kg of aluminum to be purified and recovered. When the amount of gas to be introduced is less than 0.01 liter per kg of aluminum to be purified and recovered, the purification effect achieved is small. On the other hand, when it is greater than 150 liters or more, its introduction velocity becomes larger than the surfacing velocity of the gas bubbles, causing vigorous scattering of the molten aluminum on the molten metal surface, and also resulting in large metal loss.

In the molten aluminum rotating around the cooling body, a centrifugal force arises due to the rotational movement of the molten aluminum itself. The magnitude of the centrifugal force is expressed by the following equation, where a represents the centrifugal acceleration.

$$a = r\omega^2 = \frac{v^2}{r}$$

In the above equation, r represents the distance from the center of the rotational movement, ω represents the angular velocity of the molten aluminum, and v represents the rotational velocity of the molten aluminum. The gas bubbles introduced into the molten aluminum in rotational movement are accelerated towards the center of the rotational movement (i.e., the solidification interface between the purified aluminum crystallized on the surface of the cooling body and the molten aluminum) by the reaction force to the centrifugal force expressed by the above equation, so that the bubbles reach and are pressed against the solidification interface. When the gas bubbles reach the solidification interface, they also act on a concentrated layer of impurities arising in the vicinity of the solidification interface. Specifically, an intense stirring effect occurs on the concentrated layer of the impurities, as the reaction force to the centrifugal force causes the gas bubbles to go upward while chafing against the solidification interface, which removes the concentrated layer of impurities and enhances a dispersion of the impurities from the concentrated layer of impurities into the molten aluminum (which contains a lower impurity concentration than the concentrated layer of impurities).

The aforementioned centrifugal acceleration can be derived from the distance from the center of the rotational movement and the rotational velocity of the molten aluminum. Generally, it is extremely difficult to directly measure the rotational velocity of the molten aluminum. Thus, Reynolds' principle of similarity is used to estimate the rotational velocity of the molten aluminum. According to Reynolds' principle of similarity, even if mutual systems differ in the scale of representative length L, the scale of velocity U, the density of fluid , and the coefficient of viscosity , if both Reynolds numbers are the same, the flow fields are dynamically analogous. The Re is expressed by the following equation:

$$Re = \frac{UL}{v}$$

where U represents the representative velocity, L represents the representative length, and v represents the coefficient of kinematic viscosity ($\mu/\rho$). Concretely, a rotational velocity measuring setup is prepared, wherein the scale, and the conditions on which the fluid is rotated are the same as those in the purification apparatus, and a fluid having the same coefficient of kinematic viscosity as that of the molten aluminum is used so that the "Re" values become equal. If a transparent fluid (model fluid) having the same coefficient of kinematic viscosity as that of the molten aluminum at temperatures around room temperature is used, the flow field of the molten aluminum can be recreated at room temperature, so that the observation thereof becomes possible. Resin powder particles (i.e., a tracer) with substantially the same density as that of the model fluid are mixed and dispersed in the fluid to determine the velocity of the particles, thereby enabling an estimation of the rotational velocity of the molten aluminum.

Accordingly, when utilizing the procedure as described above, the centrifugal acceleration exerted on the molten aluminum is preferably measured according to a tracer method by using polyether sulfone as a tracer and ethanol as a model fluid, and taking measurements at an analogous distance of 1 mm to 10 mm from the solidification interface.

The purified aluminum obtained by the method of the present invention can be used as a material for aluminum foil for an electrolytic capacitor. The purified aluminum obtained according to the method of the present invention, when used as a material for aluminum foil for an electrolytic capacitor, has preferably a Si content of 35 wt ppm or less, and a Fe content of 30 wt ppm or less, and more preferably a Si content of 30 wt ppm or less, and a Fe content of 15 wt ppm or less.

In the method of the present invention, the content of Si and Fe in the purified aluminum varies depending upon the centrifugal acceleration exerted on the molten aluminum rotating around the cooling body. Therefore, it is possible to select the centrifugal acceleration and rotating velocity corresponding to the required purity of the purified aluminum.

The purified aluminum obtainable by the method of the present invention can be subjected to subsequent manufacture steps such as slab casting, hot rolling, cold rolling, and foil rolling to be processed into aluminum foil for an electrolytic capacitor as described, for example, in "Foundation and Industrial Technology of Aluminum Materials" (corporation Japan Light Metal Association), pp. 347 to 350.

Also, the obtained high purity aluminum is preferably used to prepare foil for an electrolytic capacitor, a sputtering target, a substrate for a hard disk, a superconducting stabilizing material, a bonding wire, and the like.

The present invention will now be described in details by way of the examples, which should not be construed as limiting the scope of the invention.

EXAMPLE 1

Molten aluminum containing Si of 200 ppm and Fe of 370 ppm as impurities is put into a crucible made of graphite with an inner diameter of 100 mm to be heated to, and kept at 665° C. by a heater. Then, air with a dew point of −7.5° C. is introduced at a flow rate of 0.5 /min from the center of the bottom of the crucible, and a cooling body made of graphite with an external diameter of 30 mm is immersed in the molten aluminum. Then, the crucible is rotated at a rotation speed of 1000 rpm while supplying nitrogen gas for cooling into the cooling body. The rotating velocity of the molten aluminum located at a distance of 10 mm from the solidification interface at the initial stage of crystallization towards the molten aluminum is 0.40 m/s, while the centrifugal acceleration at this position is 6.4 m/s$^2$. The molten aluminum in contact with the solidification interface rotates at the same velocity as that of the cooling body. Therefore, the rotating velocity of the molten aluminum calculated from the external diameter of the cooling body and crystallized aluminum, and the rotation speed thereof is 1.57 m/s at the time when aluminum has not been crystallized yet, while the centrifugal acceleration at this position is 164 m/s$^2$. At the completion of crystallization, the rotation speed thereof is 2.75 m/s, while the centrifugal acceleration at this position is 288 M/s$^2$. The amount of argon gas introduced is 56 liters per kg of aluminum recovered, while the solidification rate is 22 mm/h. In this manner, the rotation of the crucible is stopped after 150 g of aluminum has been crystallized, and the cooling body is pull up to recover the crystallized aluminum. The impurity concentration in the recovered aluminum is 26 ppm for Si, and 13 ppm for Fe.

EXAMPLE 2

An experiment is carried out on the same conditions as those in the example 1, except that the introduced gas is air with a dew point of −35° C. The rotating velocity of the molten aluminum located at a distance of 10 mm from the solidification interface at the initial stage of crystallization towards the molten aluminum is 0.40 m/s, while the centrifugal acceleration at this position is 6.4 M/s$^2$. The rotating velocity of the molten aluminum in contact with the solidification interface is in the range of 1.57 m/s to 3.00 m/s, while the centrifugal acceleration at this position is in the range of 164 M/s$^2$ to 314 M/s$^2$. The amount of nitrogen gas introduced is 54 liters per kg of aluminum recovered, while the solidification rate is 23 mm/h. The concentration of impurities in 190 g of aluminum obtained is 23 ppm for Si, and 14 ppm for Fe.

EXAMPLE 3

An experiment is carried out on the same conditions as those in the example 1, except that the introduced gas is argon gas with a dew point of −35° C. The rotating velocity of the molten aluminum located at a distance of 10 mm from the solidification interface at the initial stage of crystallization towards the molten aluminum is 0.40 m/s, while the centrifugal acceleration at this position is 6.4 m/s$^2$. The rotating velocity of the molten aluminum in contact with the solidification interface is in the range of 1.57 m/s to 2.41 m/s, while the centrifugal acceleration at this position is in the range of 164 m/s$^2$ to 252 m/s$^2$. The amount of argon gas introduced is 65 liters per kg of aluminum recovered, while the solidification rate is 28 mm/h. The concentration of impurities in 100 g of aluminum obtained is 29 ppm for Si, and 16 ppm for Fe.

EXAMPLE 4

An experiment is carried out on the same conditions as those in the example 1, except that the introduced gas is nitrogen gas with a flow rate of 0.2 l/min, and a dew point of −35° C. The rotating velocity of the molten aluminum located at a distance of 10 mm from the solidification interface at the initial stage of crystallization towards the molten aluminum is 0.40 m/s, while the centrifugal acceleration at this position is 6.4 m/s$^2$. The rotating velocity of the molten aluminum in contact with the solidification interface is in the range of 1.57 m/s to 2.41 m/s, while the centrifugal acceleration at this position is in the range of 164 m/s$^2$ to 252 m/s$^2$. The amount of nitrogen gas introduced is 28 liters per kg of aluminum recovered, while the solidification rate is 28 mm/h. The concentration of impurities in 100 g of aluminum obtained is 28 ppm for Si, and 15 ppm for Fe.

EXAMPLE 5

An experiment is carried out on the same conditions as those in the example 1, except that the cooling body is rotated at a rotation speed of 500 rpm (relative speed is 785 mm/s), and that the introduced gas is nitrogen gas with a dew point of −7.5° C. The rotating velocity of the molten aluminum located at a distance of 10 mm from the solidification interface at the initial stage of crystallization towards the molten aluminum is 0.20 m/s, while the centrifugal acceleration at this position is 1.5 m/s$^2$. The rotating velocity of the molten aluminum in contact with the solidification interface is in the range of 0.79 m/s to 1.54 m/s, while the centrifugal acceleration at this position is in the range of 41 m/s$^2$ to 81 m/s$^2$. The amount of nitrogen gas introduced is 40 liters per kg of aluminum recovered, while the solidification rate is 32 mm/h. The concentration of impurities in 210 g of aluminum obtained is 24 ppm for Si, and 11 ppm for Fe.

EXAMPLE 6

A purification experiment is carried out on the same conditions as those in the example 5, except that the introduced gas is air with a dew point of −35° C. The rotating velocity of the molten aluminum located at a distance of 10 mm from the solidification interface at the initial stage of crystallization towards the molten aluminum is 0.20 m/s, while the centrifugal acceleration at this position is 1.5 M/s$^2$. The rotating velocity of the molten aluminum in contact with the solidification interface is in the range of 0.79 m/s to 1.25 m/s, while the centrifugal acceleration at this position is in the range of 41 M/s$^2$ to 65 M/s$^2$. The amount of nitrogen gas introduced is 67 liters per kg of aluminum recovered, while the solidification rate is 26 mm/h. The concentration of impurities in 110 g of aluminum obtained is found to be 26 ppm for Si, and 13 ppm for Fe.

EXAMPLE 7

An experiment is carried out on the same conditions as those in the example 5, except that the introduced gas is nitrogen with a dew point of −35° C. The rotating velocity of the molten aluminum located at a distance of 10 mm from the solidification interface at the initial stage of crystallization towards the molten aluminum is 0.20 m/s, while the centrifugal acceleration at this position is 1.5 M/s$^2$. The rotating velocity of the molten aluminum in contact with the solidification interface is in the range of 0.79 m/s to 1.45 m/s, while the centrifugal acceleration at this position is in the range of 41 m/s$^2$ to 76 m/s$^2$. The amount of nitrogen gas introduced is 56 liters per kg of aluminum recovered, while the solidification rate is 24 mm/h. The concentration of impurities in 180 g of aluminum obtained is 29 ppm for Si, and 16 ppm for Fe.

COMPARATIVE EXAMPLE 1

An experiment is carried out on the same conditions as those in the example 1, except that gas is not introduced into molten aluminum. The rotating velocity of the molten aluminum located at a distance of 10 mm from the solidification interface at the initial stage of crystallization towards the molten aluminum is 0.40 m/s, while the centrifugal acceleration at this position is 6.4 M/s$^2$. The rotating velocity of the molten aluminum in contact with the solidification interface is in the range of 1.57 m/s to 2.41 m/s, while the centrifugal acceleration at this position is in the range of 164 m/s$^2$ to 252 m/s$^2$. The solidification rate is 36 mm/h. The concentration of impurities in 100 g of aluminum obtained is 36 ppm for Si, and 24 ppm for Fe.

COMPARATIVE EXAMPLE 2

An experiment is carried out on the same conditions as those in the example 5, except that gas is not introduced into molten aluminum. The rotating velocity of the molten aluminum located at a distance of 10 mm from the solidification interface at the initial stage of crystallization towards the molten aluminum is 0.40 m/s, while the centrifugal acceleration at this position is 6.4 m/s$^2$. The rotating velocity of the molten aluminum in contact with the solidification interface is in the range of 0.79 m/s to 1.21 m/s, while the centrifugal acceleration at this position is in the range of 41 m/s$^2$ to 63 m/s$^2$. The solidification rate is 32 mm/h. The concentration of impurities in 100 g of aluminum obtained is found to be 36 ppm for Si, and 30 ppm for Fe.

The above results are shown in a table below.

TABLE 1

| | Introduced gas | | | Rotation speed of a cooling body (rpm) | Centrifugal acceleration (010 mm from solidification interface) (m/s²) | Solidification rate (mm/h) | Impurities | |
|---|---|---|---|---|---|---|---|---|
| | Kind of gas | Dew point (° C.) | Flow rate (l/min) | Amount of introduction (l/kgAl) | | | | Si (ppm) | Fe (ppm) |
| Example 1 | Air | −7.5 | 0.5 | 56 | 1000 | 0.2 ~ 285 | 22 | 26 | 13 |
| Example 2 | Air | −35 | 0.5 | 54 | 1000 | 0.2 ~ 314 | 23 | 23 | 14 |
| Example 3 | Argon | −35 | 0.5 | 65 | 1000 | 0.2 ~ 252 | 28 | 29 | 16 |
| Example 4 | Nitrogen | −35 | 0.2 | 28 | 1000 | 0.2 ~ 252 | 28 | 28 | 15 |
| Comparative example 1 | None | | 0 | 0 | 1000 | 0.2 ~ 252 | 36 | 36 | 24 |
| Example 5 | Nitrogen | −7.5 | 0.5 | 40 | 500 | 0.4 ~ 81 | 32 | 24 | 11 |
| Example 6 | Air | −35 | 0.5 | 67 | 500 | 0.4 ~ 65 | 26 | 26 | 13 |
| Example 7 | Nitrogen | −35 | 0.5 | 56 | 500 | 0.4 ~ 77 | 24 | 29 | 16 |
| Comparative example 2 | None | | 0 | 0 | 500 | 0.4 ~ 63 | 32 | 36 | 30 |
| Concentration at initial stage | | | | | | | | 200 | 370 |

Apparent from the results shown in the above table, the introduced gas bubbles act on the solidification interface by rotating a cooling body, thereby enabling the removal of eutectic crystal impurities in aluminum with high efficiency. As in the comparative examples, even if the cooling body is rotated, which causes the molten aluminum to rotate around the cooling body, if the gas bubbles are not introduced, the eutectic crystal impurities in aluminum cannot be removed sufficiently.

What is claimed is:

1. A method for producing a high purity aluminum, said method comprising the steps of:

immersing a cooling body in a molten aluminum, wherein the molten aluminum is at a temperature that is within a liquid phase temperature range thereof, and wherein the surface temperature of an exterior surface of the cooling body is less than said liquid phase temperature range of the molten aluminum; and forming and growing crystals of the high purity aluminum on the exterior surface of the cooling body by (i) rotating the cooling body to cause the molten aluminum to rotate such that the centrifugal acceleration exerted on the molten aluminum by said rotation falls within the range of 0.01 m/s² to 1500 m/s², and (ii) introducing bubbles of a gas into the rotating molten aluminum such that the amount of gas bubbles introduced into the molten aluminum falls within the range of from 0.01 to 150 liters, when measured at 25° C., 1 atmosphere of pressure(760 mm Hg), for each kilogram of the high purity aluminum that is forming and growing as crystals on the surface of the cooling body.

2. The method according to claim 1, wherein the gas for forming the gas bubbles is selected from the group consisting of an inactive gas, nitrogen, air, chlorine gas, chloride gas, and mixtures thereof.

3. The method according to claim 1, wherein the gas for forming the gas bubbles is air.

4. The method according to claim 1, wherein the gas for forming the gas bubbles is an inactive gas, nitrogen, or inactive gas and nitrogen, and the dew point of the gas is in the range of from −8° C. to 30° C.

5. A method for producing a high purity aluminum, said method comprising the steps of:

immersing a cooling body in a molten aluminum, wherein the molten aluminum is at a temperature that is within a liquid phase temperature range thereof, and wherein the surface temperature of an exterior surface of the cooling body is less than said liquid phase temperature range of the molten aluminum; and forming and growing crystals of the high purity aluminum on the exterior surface of the cooling body by (i) rotating the cooling body to cause the molten aluminum to rotate such that the centrifugal acceleration exerted on the molten aluminum by said rotation falls within the range of 0.01 m/S² to 1500 M/s² when measured according to a tracer method using polyether sulfone as a tracer and ethanol as a model fluid, and (ii) introducing bubbles of a gas into the rotating molten aluminum such that the amount of gas bubbles introduced into the molten aluminum falls within the range of from 0.01 to 150 liters, when measured at 25° C., 1 atmosphere of pressure(760 mm Hg), for each kilogram of the high purity aluminum that is forming and growing as crystals on the surface of the cooling body.

* * * * *